United States Patent
Brown et al.

(10) Patent No.: US 8,529,189 B2
(45) Date of Patent: Sep. 10, 2013

(54) LINEAR QUADRATIC REGULATOR CONTROL FOR BLEED AIR SYSTEM FAN AIR VALVE

(75) Inventors: Ryan Brown, Chandler, AZ (US); Jason Olivarez, Tempe, AZ (US); Kenneth Roberts, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 900 days.

(21) Appl. No.: 12/693,031

(22) Filed: Jan. 25, 2010

(65) Prior Publication Data

US 2010/0192593 A1   Aug. 5, 2010

Related U.S. Application Data

(60) Provisional application No. 61/148,590, filed on Jan. 30, 2009.

(51) Int. Cl.
*F04D 27/00* (2006.01)
*F01B 25/10* (2006.01)
*F02K 3/06* (2006.01)

(52) U.S. Cl.
USPC ............... 415/1; 415/17; 415/175; 60/266; 60/226.1

(58) Field of Classification Search
USPC .............. 415/1, 17, 47, 114, 118, 175, 144, 415/145; 60/782, 795, 785, 266, 39.23, 226.1
See application file for complete search history.

(56) References Cited

U.S. PATENT DOCUMENTS

| | | | |
|---|---|---|---|
| 4,411,595 A * | 10/1983 | Pisano | .............................. 416/1 |
| 5,161,364 A | 11/1992 | Bruun et al. | |
| 5,687,077 A | 11/1997 | Gough, Jr. | |
| 6,064,332 A | 5/2000 | Cloutier | |
| 6,305,156 B1 * | 10/2001 | Lui | .................................. 60/785 |
| 6,364,602 B1 * | 4/2002 | Andrew et al. | .................... 415/1 |
| 6,415,595 B1 * | 7/2002 | Wilmot et al. | ................... 60/785 |
| 7,152,023 B2 * | 12/2006 | Das | ..................................... 703/2 |
| 7,459,175 B2 | 12/2008 | Kaushal et al. | |
| 2004/0141836 A1 | 7/2004 | McAuliffe et al. | |
| 2006/0063048 A1 | 3/2006 | Kolodziej | |
| 2006/0074501 A1 | 4/2006 | Hartman et al. | |
| 2007/0119584 A1 | 5/2007 | Scherer et al. | |
| 2007/0270983 A1 | 11/2007 | Yasui | |
| 2008/0082304 A1 | 4/2008 | Miller | |
| 2008/0097658 A1 | 4/2008 | Shue et al. | |
| 2008/0264084 A1 | 10/2008 | Derouineau et al. | |
| 2008/0264380 A1 | 10/2008 | Kang et al. | |
| 2009/0193811 A1 * | 8/2009 | Monteiro et al. | ................ 60/782 |

* cited by examiner

*Primary Examiner* — Nathaniel Wiehe
*Assistant Examiner* — Aaron Jagoda
(74) *Attorney, Agent, or Firm* — Ingrassia Fisher & Lorenz, P.C.

(57) ABSTRACT

A system and method are provided for controlling the temperature of engine bleed air from a turbofan gas turbine engine. The system includes a fan air valve and a fan air valve controller. The fan air valve is adapted to receive a flow of fan air from a turbofan gas turbine engine intake fan. The fan air valve is coupled to receive valve position commands and is configured, in response to the valve position commands, to move to a valve position to thereby control the engine bleed air temperature. The fan air valve controller is configured to implement a linear quadratic regulator (LQR) control. The fan air valve controller is adapted to receive a plurality of sensor signals, each sensor signal representative of one or more system parameters, and is configured, in response to the sensor signals, to supply the valve position commands to the fan air valve.

17 Claims, 4 Drawing Sheets

LINEAR QUADRATIC REGULATOR CONTROL FOR BLEED AIR SYSTEM FAN AIR VALVE

PRIORITY CLAIM

This application claims the benefit of U.S. Provisional Application No. 61/148,590, filed Jan. 30, 2009.

TECHNICAL FIELD

The present invention generally relates to valve control and, more particularly, to a linear quadratic regulator control scheme for an aircraft engine bleed air temperature control system.

BACKGROUND

A gas turbine engine may be used to supply power to various types of vehicles and systems. For example, gas turbine engines may be used to supply propulsion power to an aircraft. Many gas turbine engines include at an intake section, a compressor section, a combustor section, and a turbine section. The intake section includes a fan, which draws air into the engine and accelerates it. A fraction of the accelerated air exhausted from the fan is directed through an engine bypass section disposed between a fan case and an engine cowl, and provides a forward thrust.

The compressor section, which may include two or more compressor stages, receives the flow of intake air from the fan and raises the pressure of this air to a relatively high level. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is then exhausted from the engine. Similar to the compressor section, in a multi-spool engine the turbine section may include a plurality of turbine stages. The energy generated in each of the turbines may be used to power other portions of the engine.

In addition to providing propulsion power, a gas turbine engine may also, or instead, be used to supply either, or both, electrical and pneumatic power to the aircraft. For example, some gas turbine engines include a bleed air port on the compressor section. The bleed air port allows some of the compressed air from the compressor section to be diverted away from the combustor and turbine sections, and supplied to various pneumatic loads. These pneumatic loads may vary, but may include air conditioning, bay ventilation, and cabin pressure control, just to name a few.

No matter the specific pneumatic loads, before the engine bleed air is supplied to these loads, it is typically cooled to a lower, more acceptable temperature. In turbofan gas turbine engines, bypass fan air may be controllably supplied to a heat exchanger. In the heat exchanger, heat from the engine bleed air is transferred to the cooler bypass fan air. The flow of the bypass fan air, and thus the temperature of the engine bleed air exiting the heat exchanger, may be controlled by a fan air valve (FAV). In particular, an FAV controller supplies valve position signals to the FAV to control its position, and thus engine bleed air temperature.

Many presently known FAV controllers use position feedback to provide suitable response requirements. However, ambient temperatures in some engine nacelles may be too high for a suitable position feedback device. Moreover, existing classical control methods on temperature may not exhibit desirable transient responses.

Accordingly, it is desirable to provide a control system and method for a FAV that provides a suitable response time and/or does not exhibit undesirable overshoot and/or uses sensors that may be used in other control functions of various engine nacelles. The present invention addresses at least these needs.

BRIEF SUMMARY

In one embodiment, and by way of example only, a system for controlling gas turbine engine bleed air temperature includes a fan air valve and a fan air valve controller. The fan air valve is adapted to receive a flow of fan air from a turbofan gas turbine engine intake fan. The fan air valve is coupled to receive valve position commands and is configured, in response to the valve position commands, to move to a valve position to thereby control the engine bleed air temperature. The fan air valve controller is configured to implement a linear quadratic regulator (LQR) control. The fan air valve controller is adapted to receive a plurality of sensor signals, each sensor signal representative of one or more system parameters, and is configured, in response to the sensor signals, to supply the valve position commands to the fan air valve.

In another exemplary embodiment, a turbofan gas turbine engine bleed air temperature control system includes a heat exchanger, a bleed air temperature sensor, a fan air temperature sensor, a fan air valve, and a fan air valve controller. The heat exchanger has a bleed air inlet, a bleed air outlet, a cooling air inlet, and a cooling air outlet. The bleed air inlet is adapted to receive a flow of bleed air from a turbofan gas turbine engine. The cooling air inlet is adapted to receive a flow of cooling air from a turbofan gas turbine engine intake fan. The heat exchanger is configured to facilitate heat transfer from the bleed air to the cooling air and thereby discharge relatively cooler bleed air from the bleed air outlet, and relatively warmer cooling air from the cooling air outlet. The bleed air temperature sensor is disposed downstream of the bleed air outlet, and is configured to sense the temperature of the bleed air discharged from the bleed air outlet and supply a bleed air temperature signal representative thereof. The fan air temperature sensor is disposed downstream of the fan air outlet, and is configured to sense the temperature of the fan air discharged from the fan air outlet and supply a fan air temperature signal representative thereof. The fan air valve is disposed upstream of the cooling air inlet. The fan air valve is coupled to receive valve position commands and is configured, in response to the valve position commands, to move to a valve position and thereby control the flow of cooling air into the cooling air inlet. The fan air valve controller is configured to implement a linear quadratic regulator (LQR) control. The fan air valve controller is adapted to receive at least the bleed air temperature signal, the fan air temperature signal, and a signal representative of fan air flow through the heat exchanger, and is configured, in response to at least these signals, to supply the valve position commands to the fan air valve.

In yet another exemplary embodiment, a method of controlling bleed air temperature from a turbofan gas turbine engine includes flowing engine bleed air through a heat exchanger, and flowing fan air through a fan air valve and the heat exchanger to thereby cool the engine bleed air and supply cooled engine bleed air, the fan air valve disposed upstream of the heat exchanger. Cooled engine bleed air temperature, fan air temperature, and fan air flow through the heat exchanger are determined The determined fan air flow, fan air temperature, and cooled engine bleed air temperature are supplied to a controller that implements linear quadratic regulator (LQR) control. The linear quadratic regulator (LQR) control is used to control fan air valve position, to thereby control fan air flow into the heat exchanger and cooled engine bleed air temperature;

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
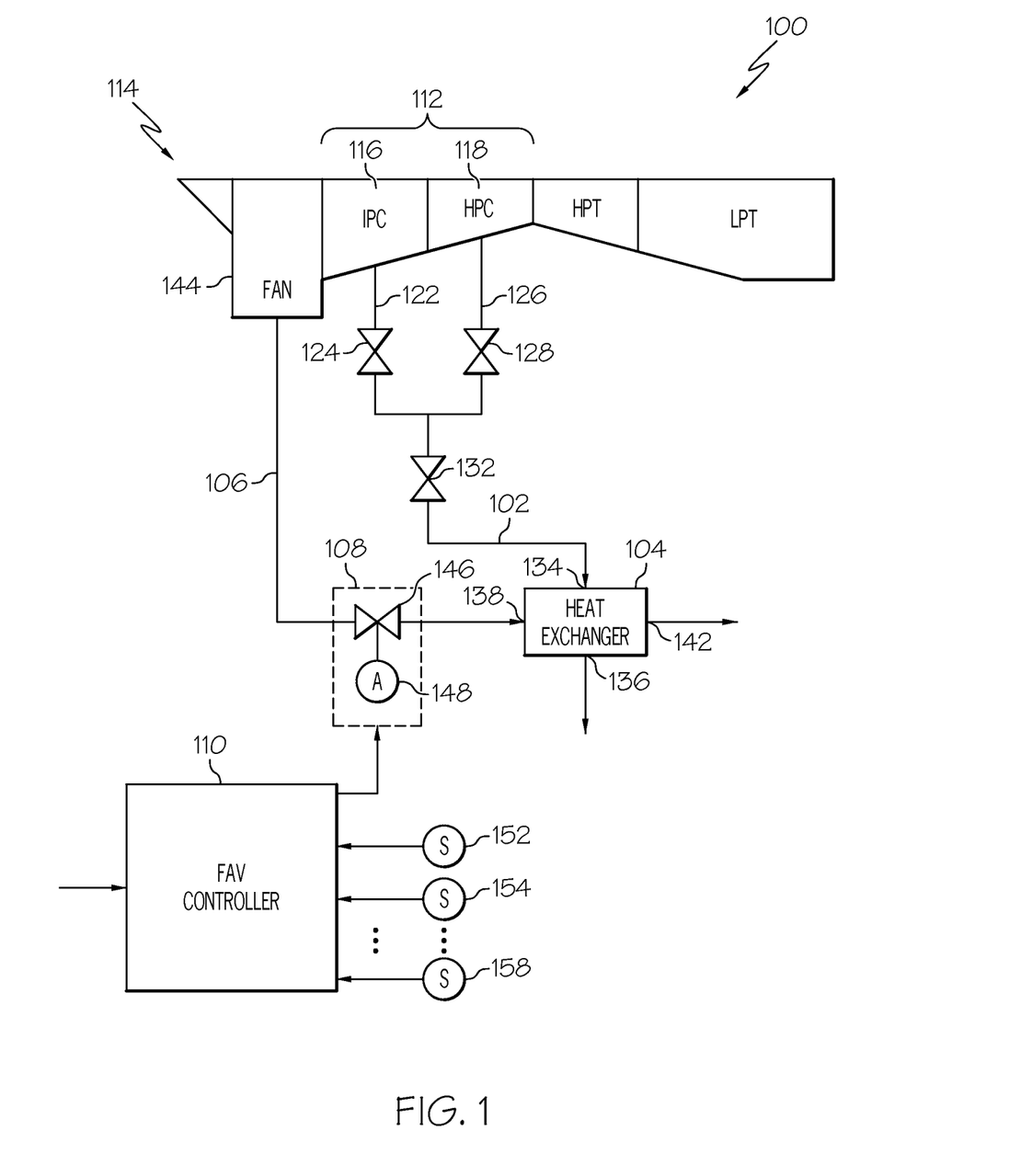
FIG. 1 depicts an exemplary bleed air temperature control system.

Turning now to FIG. 1, a schematic diagram of at least a portion of an exemplary gas turbine engine bleed air system 100 is depicted and includes a bleed air conduit 102, a heat exchanger 104, a fan air conduit 106, a fan air valve (FAV) 108, and a FAV controller 110. The bleed air conduit 102 is coupled to receive compressed air from the compressor section 112 of a gas turbine engine 114. It will be appreciated that the engine bleed air system 100 may be configured such that the bleed air conduit 102 may receive compressed air from one or more compressors in the engine compressor section 112. For example, in the depicted embodiment the engine bleed air system 100 is configured such that the bleed air conduit 102 may selectively receive relatively low pressure bleed air from an intermediate pressure compressor 116 or relatively high pressure bleed air from a high-pressure compressor 118.

In particular, at least in the depicted embodiment, the bleed air conduit 102 is coupled to receive relatively low pressure bleed air from the intermediate pressure compressor 116 via a low pressure bleed air supply conduit 122 and a low pressure bleed air supply valve 124. The bleed air conduit 102 is also coupled to receive relatively high pressure bleed air from the high pressure compressor 118 via a high pressure bleed air supply conduit 126 and a high pressure bleed air supply valve 128. It will be appreciated that the valves 124 and 126 may be variously configured. In one particular preferred implementation, the low pressure bleed air supply valve 124 is implemented using a check valve, and the high pressure bleed air supply valve 128 is implemented using a shut-off valve. As FIG. 1 further depicts, a controllable bleed air shut-off valve 132 may also be mounted on the bleed air conduit 102 to allow or prevent low-pressure or high-pressure bleed air from flowing into the bleed air conduit 102.

No matter the number or types of valves on, or upstream of, the bleed air conduit 102, any bleed air that flows into the bleed air conduit 102 is supplied to various non-illustrated pneumatic loads via the heat exchanger 104. The heat exchanger 104, which may be implemented using any one of numerous heat exchanger configurations, includes a bleed air inlet 134, a bleed air outlet 136, a cooling air inlet 138, and a cooling air outlet 142. The heat exchanger 104, via the bleed air inlet 134, is coupled to receive the flow of bleed air from the bleed air conduit 102. The heat exchanger 104 is also coupled to receive, via the cooling air inlet 138, a flow of relatively cool fan air from the fan air conduit 106. The fan air conduit 106 is coupled to receive the relatively cool fan air from, for example, the fan 144 or from a suitable point in the gas turbine engine bypass section downstream of the fan 144. In either case, the heat exchanger 104 uses the relatively cool fan air in the fan air conduit 106 to cool the relatively hot engine bleed air in bleed air conduit 102 to a desired temperature. The temperature of the engine bleed air exiting the heat exchanger 104 is controlled using the FAV 108.

The FAV 108 is mounted on the fain air conduit 106 and is coupled to receive valve position commands from the FAV controller 110. The FAV 108, in response to the position commands it receives, moves to the commanded position to control the flow of fan air entering the heat exchanger 104, and thereby control the temperature of the engine bleed air exiting the heat exchanger 104. To implement this functionality, the FAV 108 includes a valve 146 and an actuator 148. The valve 146 may be implemented using any one of numerous types of valves now known and developed in the future. Similarly, the actuator 148 may be implemented using any one of numerous types of actuators now known or developed in the future. No matter the specific implementations of the valve 146 and actuator 148, valve 146 is movable between a closed position, in which fan air flow through the FAV 108 is prevented (or at least substantially inhibited), and a plurality of open positions, in which fan air may flow through the FAV 108. The actuator 148 is coupled to receive position commands supplied from the FAV controller 110 and is configured, in response to the position commands, to move the valve 146 to the commanded position.

The FAV controller 110 is coupled to receive an input command and a plurality of sensor signals. The input command is representative of a desired bleed air temperature, and may be supplied from any one of numerous non-illustrated external sources or may be a fixed, internally stored value. The sensor signals are representative of various system parameters within the engine bleed air system 100. The number and type of sensor signals may vary, and may include one or more temperature sensors, pressure sensors, and flow sensors, just to name a few. In the depicted embodiment, the system includes at least a bleed air temperature sensor 152 and a fan air temperature sensor 154. It will be appreciated that this is merely exemplary of one particular embodiment, and that in other embodiments additional or other sensors could be included in the system 100

The bleed air temperature sensor 152 is preferably mounted on, or within, the bleed air conduit 102 downstream of the heat exchanger 104. The bleed air temperature sensor 152 is configured to sense the temperature of the bleed air discharged from the heat exchanger bleed air outlet 136 and supply a bleed air temperature signal representative thereof to the FAV controller 110. The fan air temperature sensor 154 is preferably mounted on, or within, the fan air conduit 106 downstream of the heat exchanger 104. The fan air temperature sensor 154 is configured to sense the temperature of the fan air discharged from the heat exchanger fan air outlet 144 and supply a fain air temperature signal representative thereof to the FAV controller 110. It will be appreciated that the temperature sensors 152, 154 may be implemented using any one of numerous suitable sensors now known or developed in the future. It will additionally be appreciated that the system preferably includes one or more additional sensors 158 that may be used to either sense or calculate fan air flow and sense other temperatures within the bleed air system. For example, the one or more sensors 158 may include a flow sensor, to directly sense fan air flow, or a pressure sensor, which may be used, together with fan air temperature, to calculate fan air flow.

Figure 2:
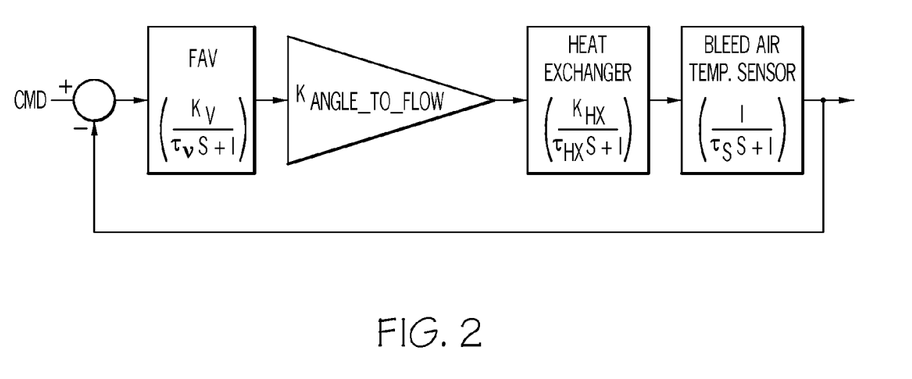
FIG. 2 depicts a linear model of the exemplary system depicted in FIG. 1.

The FAV controller 110 is configured, in response to the input command and the sensor signals, to supply the position commands to the FAV 108. To carry out this functionality, the FAV controller 108 implements a Linear Quadratic Regulator (LQR) control. To implement the LQR control, a linearized model of the FAV control system (e.g., the FAV, heat exchanger, and temperature sensor) was developed. The linearized model 200, which is depicted in FIG. 2, was broken down into a state space model, which is comprised of the traditional matrices A, B, C, and D, with D being zero in this case. For the engine bleed air system 100 these matrices are defined as follows:

A: the state matrix (states of the FAV 108, the heat exchanger 104, and the bleed air temperature sensor 152);

B: the system gains and valve time constants; and

C: sensed bleed air flow or temperatures.

Now, in the standard matrix form of:

$$\dot{x}=Ax+Bu$$

$$y=Cx+Du$$

the resultant matrices are:

$$\begin{bmatrix} \delta \dot{T}_S \\ \delta \dot{T}_{HX} \\ \delta \dot{W}_C \end{bmatrix} = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix} \begin{bmatrix} T_S \\ T_{HX} \\ W_C \end{bmatrix} + \begin{bmatrix} 0 \\ 0 \\ \frac{K_V}{\tau_V} \end{bmatrix} i$$

$$y = \begin{bmatrix} 1 & 0 & 0 \end{bmatrix} \begin{bmatrix} T_S \\ T_{HX} \\ W_C \end{bmatrix} + 0i$$

where:

$\delta()$ represents the rate of change of sensed bleed air temperature ($T_S$), sensed fan air temperature ($T_{Hx}$), and fan air flow through the heat exchanger ($W_C$);

$\tau$ represent the applicable time constants, and K represent the gains of the sensed bleed air exit temperature (S), the heat exchanger (HX), and the valve (V); and i represents the valve actuator driving current, which is the input to the control system.

Using the resultant matrices and the defined control parameter matrices Q and R, which are used for tuning the FAV controller 110, the system is then analyzed to find an optimal controller feedback gain matrix (K) of the system using known LQR techniques. That is, the system is analyzed to find the controller gain matrix (K) that minimizes the cost function:

$$J = \int_0^T (x^T Q x + u^T R u) dt.$$

The Q and R matrices are initially selected by choosing diagonal matrices that are positive and definite. Moreover, the magnitude of the Q matrix components were chosen for a maximum expected value of the output (i.e., bleed air exit temperature) squared (i.e., $T_s^2$), and the magnitudes of the R matrix components were chosen for a maximum expected value of the controller output divided by the process input squared (i.e., $(T_s/i)^2$). Thereafter, fine tuning to the Q and R matrices was iteratively conducted to produce improved response characteristics. In particular, the magnitude of the Q matrix was halved, and the magnitude of the R matrix was reduced by an order of magnitude.

Once the Q and R matrices are selected, the optimal gain matrix K is then found from the solution that minimizes the cost function J through the state-feedback control law:

$$u=-Kx,$$

while also being subject to:

$$\dot{x}=Ax=Bu,$$

and the algebraic Riccati equation:

$$0=-SA-A^T S+SB R^{-1} B^T S-Q.$$

Figure 3:
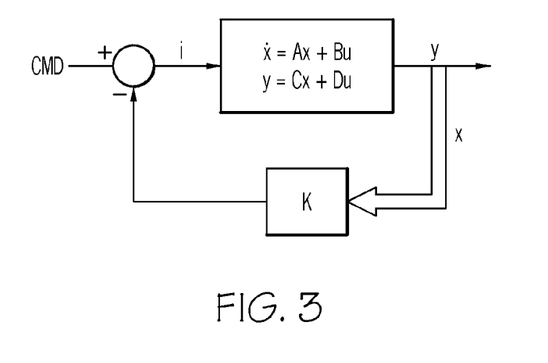
FIG. 3 depicts a representation of the closed loop system according to the present invention.

In particular, it is noted that the closed-loop system, as depicted in FIG. 3, has the form:

$$\dot{x}=(A-BK)x,$$

such that the output vector is:

$$u=-Kx,$$

And the feedback gain matrix (K) is a properly dimensioned matrix given by:

$$K=R^{-1}B^T S,$$

where S is the solution to the algebraic Riccati equation. Once the gain matrix (K) is determined, it is then used in the FAV controller 110 to generate a new A matrix for the system subject to:

$$A_{i+1}=A_i-B_i*K.$$

During implementation of the LQR control, estimates of the system state may include an error. This state estimation error is defined as:

$$e=x-\hat{x},$$

where $\hat{x}$ is the estimate of the state. This leads to:

$$e=Ax-A\hat{x}=Ae.$$

Thus, for a stable state matrix (A), the error of the system will converge to zero for any input, correlating to $\hat{x}$ converging to x. Although the state estimation error (e) may be variously calculated, in a particular preferred implementation it is calculated by:

$$E = \begin{bmatrix} A & B \\ C & D \end{bmatrix}^{-1} \begin{bmatrix} 0 \\ \vdots \\ 1 \end{bmatrix},$$

and $$e = E(n) + K * E(1:n).$$

This allows for the generation of a new B matrix for the system subject to:

$$B_{i+1} = B_i * e.$$

The new A and B matrices are then used to redesign the control of the system.

Figure 4A:
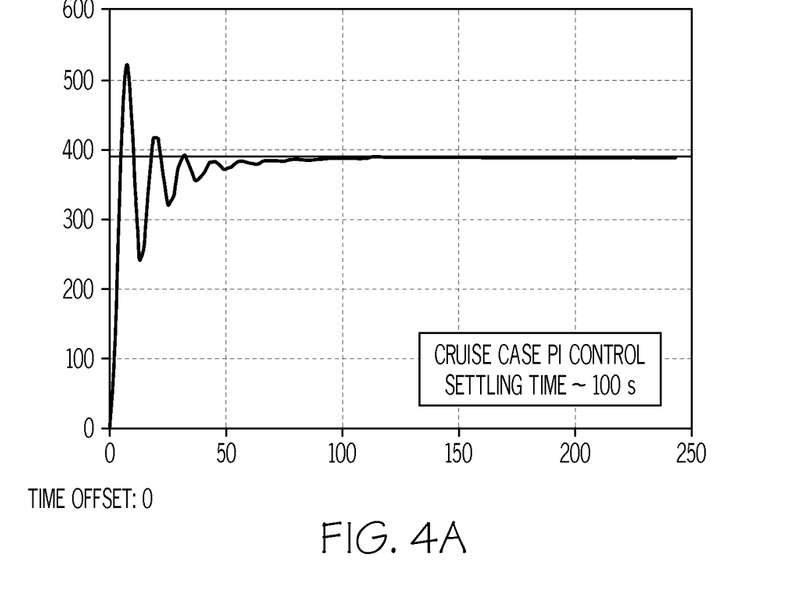
FIGS. 4A-4D depict the response of the system when controlled via conventional proportional-integral control and the LQR control of the present invention.
Figure 4B:
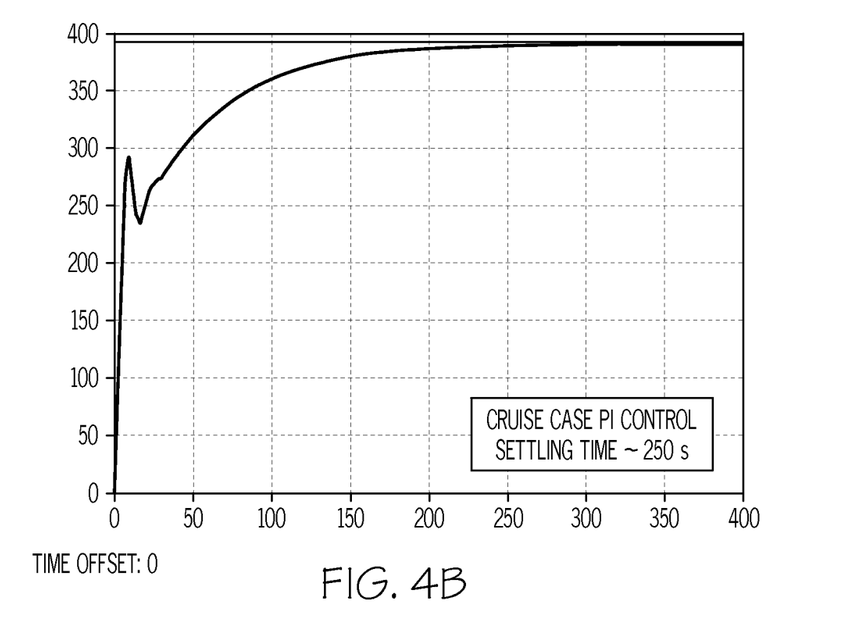
Figure 4C:
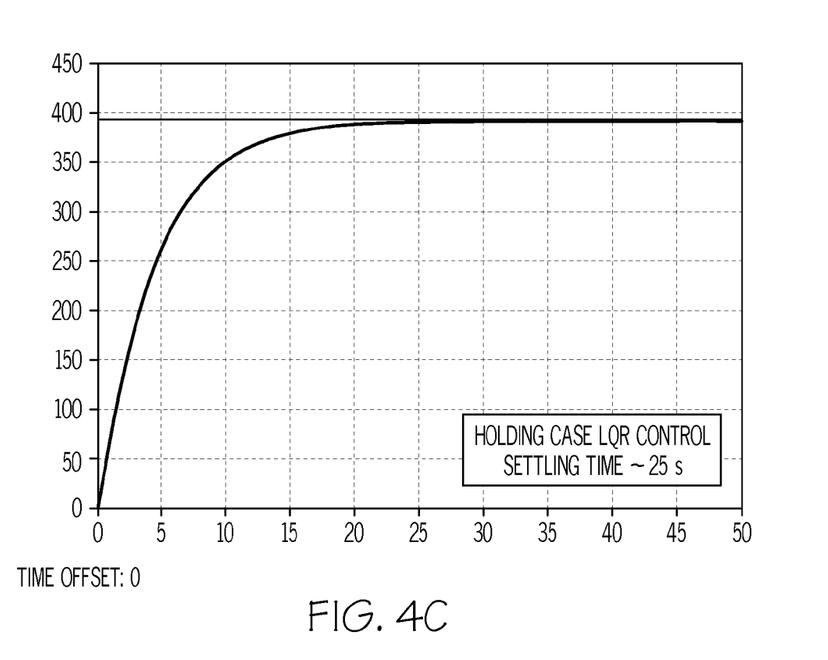
Figure 4D:
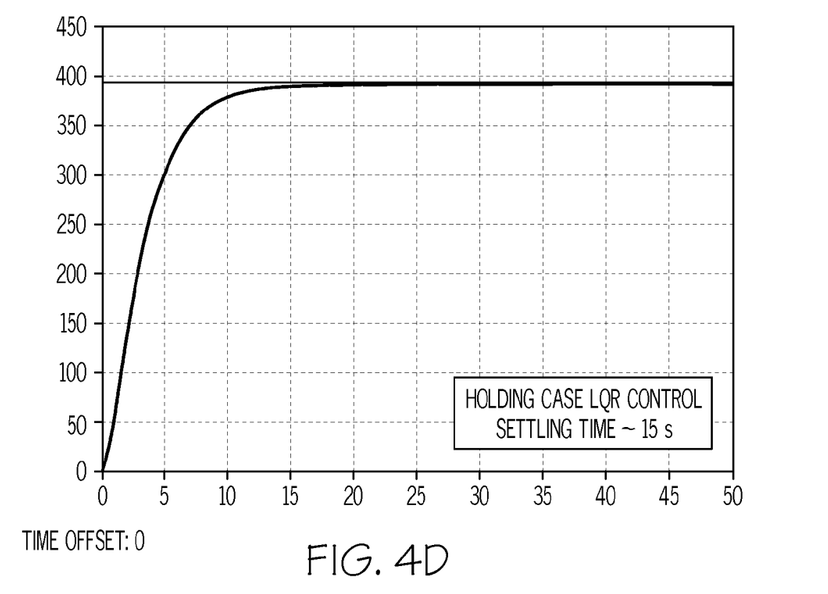

During system 100 operation, the gain matrix (K) is continuously updated, using the methodology described above, to thereby provide a continuously optimized control. Comparisons of the performance of the system 100 when implementing a known PI control and when implementing the LQR control are depicted in FIGS. 4A-4D. In particular, FIGS. 4A and 4B depict the response of the system 100 for two different cases, when a conventional PI (proportional-integral) control is used, and FIGS. 4C and 4D depict the response for these same two cases when the inventive LQR control is used. As these figures depict, the LQR control reduces the settling time and, because it is critically damped, eliminates overshoot. The LQR control described herein guarantees stability of the FAV 108 response and reduces, by an order of magnitude, the settling time relative to presently known PI control. This is because the LQR control estimates the optimal control input using full state feedback from the available sensed system variables, as opposed to the single input single output (SISO) controller, which simply manages control input based on sensed temperature.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling gas turbine engine bleed air temperature, comprising:
    a fan air valve adapted to receive a flow of fan air from a turbofan gas turbine engine intake fan, the fan air valve coupled to receive valve position commands and configured, in response to the valve position commands, to move to a valve position to thereby control the engine bleed air temperature; and
    a fan air valve controller configured to implement a linear quadratic regulator (LQR) control, the fan air valve controller adapted to receive a plurality of sensor signals, each sensor signal representative of one or more system parameters, the controller configured, in response to the sensor signals, to supply the valve position commands to the fan air valve.

2. The system of claim 1, wherein the system parameters include fan air temperature, fan air flow, and engine bleed air temperature.

3. The system of claim 2, further comprising:
    a heat exchanger having a bleed air inlet, a bleed air outlet, a fan air inlet, and a fan air outlet, the bleed air inlet adapted to receive a flow of bleed air from a turbofan gas turbine engine, the cooling air inlet adapted to receive a flow of fan air from a turbofan gas turbine engine intake fan, the heat exchanger configured to facilitate heat transfer from the bleed air to the fan air and thereby discharge relatively cooler bleed air from the bleed air outlet, and relatively warmer fan air from the fan air outlet.

4. They system of claim 3, wherein the LQR control implements a state space model derived from a linear model of the system, the state space model defined by:

$$\begin{bmatrix} \delta \dot{T}_S \\ \delta \dot{T}_{HX} \\ \delta \dot{W}_C \end{bmatrix} = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix} \begin{bmatrix} T_S \\ T_{HX} \\ W_C \end{bmatrix} + \begin{bmatrix} 0 \\ 0 \\ \frac{K_V}{\tau_V} \end{bmatrix} i$$

$$y = \begin{bmatrix} 1 & 0 & 0 \end{bmatrix} \begin{bmatrix} T_S \\ T_{HX} \\ W_C \end{bmatrix} + 0i$$

wherein:
    $\delta()$ represents rate of change of bleed air temperature ($T_S$), fan air temperature ($T_{Hx}$), and fan air flow through the heat exchanger ($W_C$);
    $\tau$ represent the applicable time constants, and K represent the gains of the sensed bleed air exit temperature (S), the heat exchanger (HX), and the valve (V); and
    i represents fan air valve drive current.

5. The system of claim 4, wherein the LQR control is configured to continuously determine a state estimation error and, based on the determined state estimation error, generate a new matrix (B) that includes fan air valve gain and fan air valve time constant, where:

$$B = \begin{bmatrix} 0 \\ 0 \\ \frac{K_V}{\tau_V} \end{bmatrix}.$$

6. The system of claim 5, wherein the state estimation error is calculated as follows:

$$E = \begin{bmatrix} A & B \\ C & D \end{bmatrix}^{-1} \begin{bmatrix} 0 \\ \vdots \\ 1 \end{bmatrix}, \text{ and}$$

$$e = E(n) + K * E(1:n).$$

7. The system of claim 5, wherein the LQR control continuously generates a new system state matrix (A), where:

$$A = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix}.$$

8. A turbofan gas turbine engine bleed air temperature control system, comprising:
    a heat exchanger having a bleed air inlet, a bleed air outlet, a cooling air inlet, and a cooling air outlet, the bleed air inlet adapted to receive a flow of bleed air from a turbofan gas turbine engine, the cooling air inlet adapted to receive a flow of cooling air from a turbofan gas turbine engine intake fan, the heat exchanger configured to facilitate heat transfer from the bleed air to the cooling air and thereby discharge relatively cooler bleed air from the bleed air outlet, and relatively warmer cooling air from the cooling air outlet;

a bleed air temperature sensor disposed downstream of the bleed air outlet, the bleed air temperature sensor configured to sense the temperature of the bleed air discharged from the bleed air outlet and supply a bleed air temperature signal representative thereof;

a fan air temperature sensor disposed downstream of the fan air outlet, the fan air temperature sensor configured to sense the temperature of the fan air discharged from the fan air outlet and supply a fan air temperature signal representative thereof;

a fan air valve disposed upstream of the cooling air inlet, the fan air valve coupled to receive valve position commands and configured, in response to the valve position commands, to move to a valve position and thereby control the flow of cooling air into the cooling air inlet; and a fan air valve controller configured to implement a linear quadratic regulator (LQR) control, the fan air valve controller adapted to receive at least the bleed air temperature signal, the fan air temperature signal, and a signal representative of fan air flow through the heat exchanger, and configured, in response to at least these signals, to supply the valve position commands to the fan air valve.

9. They system of claim 8, wherein the LQR control implements a state space model derived from a linear model of the system, the state space model defined by:

$$\begin{bmatrix} \delta \dot{T}_S \\ \delta \dot{T}_{HX} \\ \delta \dot{W}_C \end{bmatrix} = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix} \begin{bmatrix} T_S \\ T_{HX} \\ W_C \end{bmatrix} + \begin{bmatrix} 0 \\ 0 \\ \frac{K_V}{\tau_V} \end{bmatrix} i$$

$$y = \begin{bmatrix} 1 & 0 & 0 \end{bmatrix} \begin{bmatrix} T_S \\ T_{HX} \\ W_C \end{bmatrix} + 0i$$

wherein:

$\delta()$ represents rate of change of bleed air temperature ($T_S$), fan air temperature ($T_{HX}$), and fan air flow through the heat exchanger ($W_C$);

$\tau$ represent the applicable time constants, and K represent the gains of the sensed bleed air exit temperature (S), the heat exchanger (HX), and the valve (V); and i represents fan air valve drive current.

10. The system of claim 9, wherein the LQR control is configured to continuously determine a state estimation error and, based on the determined state estimation error, generate a new matrix (B) that includes fan air valve gain and fan air valve time constant, where:

$$B = \begin{bmatrix} 0 \\ 0 \\ \frac{K_V}{\tau_V} \end{bmatrix}.$$

11. The system of claim 9, wherein the state estimation error is calculated as follows:

$$E = \begin{bmatrix} A & B \\ C & D \end{bmatrix}^{-1} \begin{bmatrix} 0 \\ \vdots \\ 1 \end{bmatrix}, \text{ and}$$

$$e = E(n) + K * E(1:n).$$

12. The system of claim 9, wherein the LQR control continuously generates a new system state matrix (A), where:

$$A = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix}.$$

13. A method of controlling bleed air temperature from a turbofan gas turbine engine, the method comprising the steps of:

flowing engine bleed air through a heat exchanger;

flowing fan air through a fan air valve and the heat exchanger to thereby cool the engine bleed air and supply cooled engine bleed air, the fan air valve disposed upstream of the heat exchanger;

determining cooled engine bleed air temperature;

determining fan air temperature;

determining fan air flow through the heat exchanger;

supplying the determined fan air flow, fan air temperature, and cooled engine bleed air temperature to a controller that implements linear quadratic regulator (LQR) control; and using linear quadratic regulator (LQR) control to control fan air valve position, to thereby control fan air flow into the heat exchanger and cooled engine bleed air temperature.

14. They method of claim 13, further comprising:

developing a linear model of a system that includes at least the fan air valve, the heat exchanger, and a cooled engine bleed air temperature sensor; and deriving a state space model from the linear model of the system, the state space model defined by:

$$\begin{bmatrix} \delta \dot{T}_S \\ \delta \dot{T}_{HX} \\ \delta \dot{W}_C \end{bmatrix} = \begin{bmatrix} -\frac{1}{\tau_S} & \frac{1}{\tau_S} & 0 \\ 0 & -\frac{1}{\tau_{HX}} & \frac{K_{HX}}{\tau_{HX}} \\ 0 & 0 & -\frac{1}{\tau_V} \end{bmatrix} \begin{bmatrix} T_S \\ T_{HX} \\ W_C \end{bmatrix} + \begin{bmatrix} 0 \\ 0 \\ \frac{K_V}{\tau_V} \end{bmatrix} i$$

-continued $$y = [1 \ 0 \ 0] \begin{bmatrix} T_S \\ T_{HX} \\ W_C \end{bmatrix} + 0i$$

wherein:
  δ() represents rate of change of cooled engine bleed air temperature ($T_S$), fan air temperature ($T_{Hx}$), and fan air flow through the heat exchanger ($W_C$);
  τ represent the applicable time constants, and K represent the gains of sensed cooled bleed air temperature (S), the heat exchanger (HX), and the valve (V); and
  i represents fan air valve drive current.

15. The method of claim 14, further comprising:
  continuously determining a state estimation error; and
  based on the determined state estimation error, generating a new matrix (B) that includes fan air valve gain and fan air valve time constant, where:

$$B = \begin{bmatrix} 0 \\ 0 \\ \dfrac{K_V}{\tau_V} \end{bmatrix}.$$

16. The method of claim 15, wherein the state estimation error is continuously determined as follows:

$$E = \begin{bmatrix} A & B \\ C & D \end{bmatrix}^{-1} \begin{bmatrix} 0 \\ \vdots \\ 1 \end{bmatrix}, \text{ and}$$

$$e = E(n) + K * E(1:n).$$

17. The method of claim 15, further comprising continuously generating a new system state matrix (A), where:

$$A = \begin{bmatrix} -\dfrac{1}{\tau_S} & \dfrac{1}{\tau_S} & 0 \\ 0 & -\dfrac{1}{\tau_{HX}} & \dfrac{K_{HX}}{\tau_{HX}} \\ 0 & 0 & -\dfrac{1}{\tau_V} \end{bmatrix}.$$

* * * * *